United States Patent [19]

Cragg

[11] 3,930,551
[45] Jan. 6, 1976

[54] ELECTRIC DRIVE FOR WHEEL CHAIRS

[76] Inventor: Harold Cragg, 35 Wilmington Road, Quinton, Birmingham, 32, England

[22] Filed: June 10, 1974

[21] Appl. No.: 477,989

[30] Foreign Application Priority Data
June 9, 1973 United Kingdom............... 27553/73

[52] U.S. Cl............. 180/65 R; 74/353; 180/DIG. 3
[51] Int. Cl.² ......................................... B60K 1/00
[58] Field of Search .... 180/6.5, 65 R, 65 F, DIG. 3; 280/260; 74/353, 354

[56] References Cited
UNITED STATES PATENTS

| | | |
|---|---|---|
| 752,129 | 2/1904 | Thompson ............................. 74/353 |
| 2,836,073 | 5/1958 | Masters............................. 74/354 X |
| 3,613,813 | 10/1971 | Biddle............................... 180/6.5 |

*Primary Examiner*—Leo Friaglia
*Assistant Examiner*—John A. Pekar
*Attorney, Agent, or Firm*—Imirie, Smiley & Linn

[57] ABSTRACT

In a wheelchair, battery operated electric driving means for driving two wheels each mounted on a wheel plate connected to the wheelchair frame. For each driven wheel a motor is carried on the wheel plate and drive is transmitted to a pinion fixed on the wheel through a pivotal gear carrier carrying one or two idler gears in constant mesh with the fixed pinion, but movable into or out of mesh with a motor driven pinion on controlled pivotal movement of the gear carrier.

16 Claims, 7 Drawing Figures

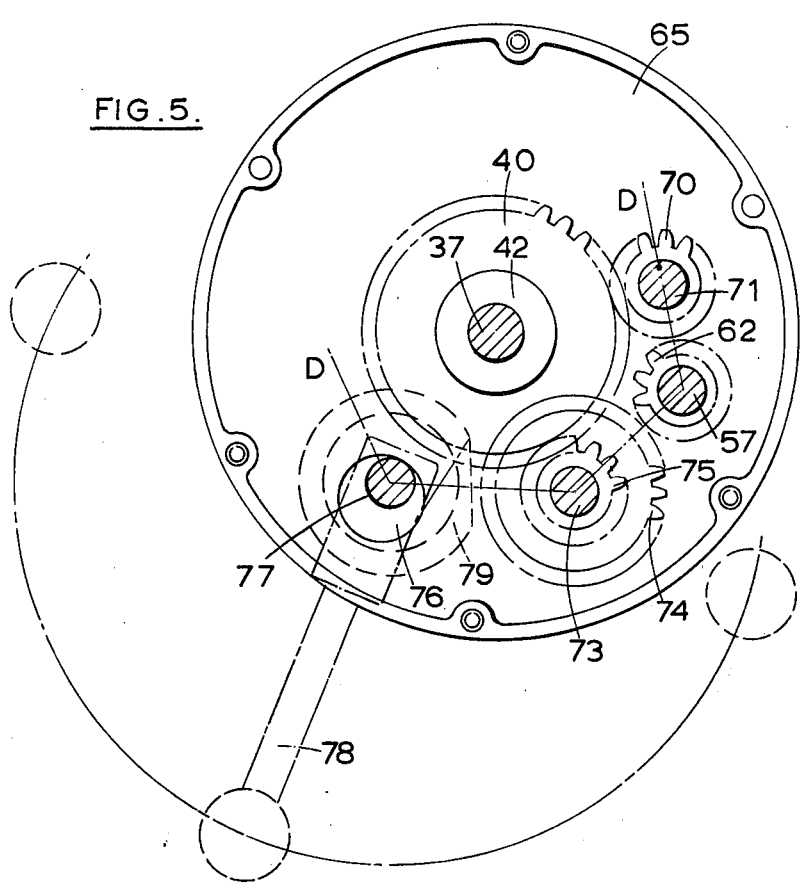

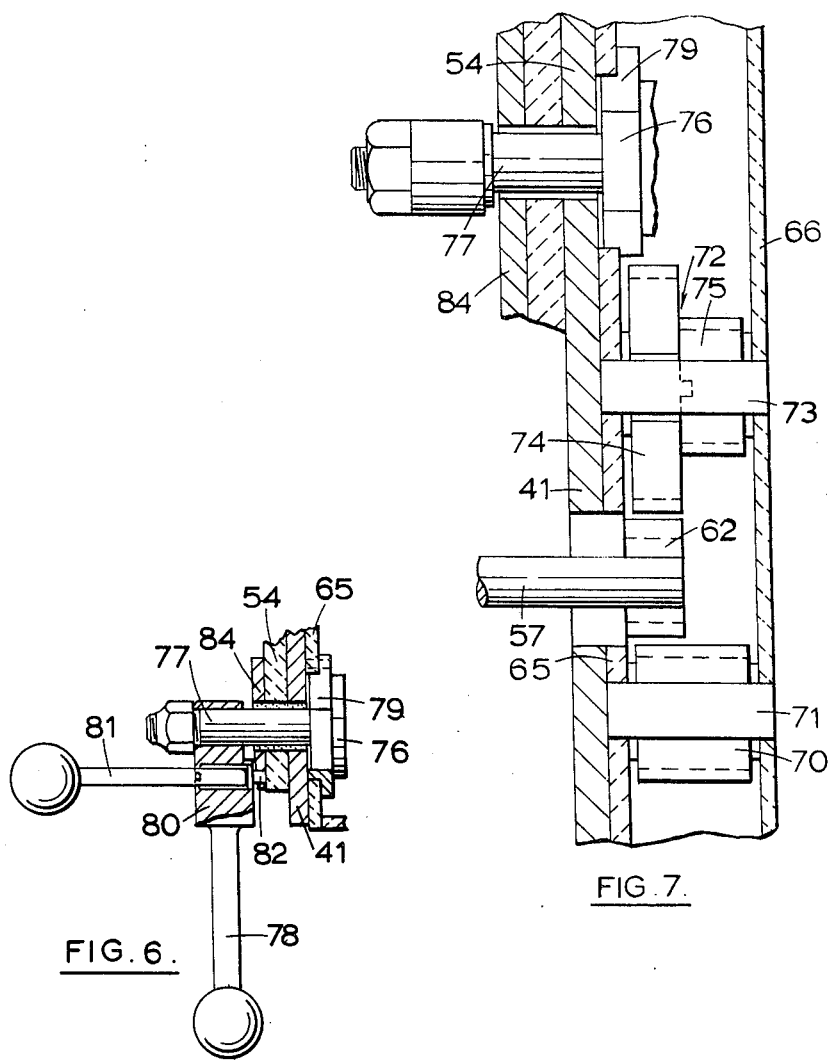

ELECTRIC DRIVE FOR WHEEL CHAIRS

BACKGROUND OF THE INVENTION

This invention is concerned with improvements in or relating to wheelchairs. In particular, this invention is concerned with electric driving means suitable for a wheelchair, as well as a wheelchair embodying electric driving means.

It is already known to use electric driving means for wheelchairs, but the known constructions have certain disadvantages some of which lead to the wheelchair being unacceptable to the user or to disapproval by controlling or regulating authorities in certain countries. For example, a belt drive to the wheels from an electric motor is generally regarded as dangerous and unsatisfactory; a direct drive from an electric motor to one or two wheels is unsatisfactory unless the drive includes a clutch because on power failure the manual propulsion power to advance the wheelchair also has to rotate the motor, additionally on mechanical failure even with a clutch, manual propulsion may not be possible. The electric motor with a direct drive may not have a power output range sufficient to meet the range of speeds and loading encountered in the everyday use of a wheelchair such as from indoors with very low speeds on substantially flat floors to road use at higher speeds say 4 miles per hour on gradients of up to 1 in 4.

SUMMARY OF THE INVENTION

An object of this invention is to provide improved electric driving means for a wheelchair which seeks to overcome the foregoing disadvantages, and which provides a simple, versatile construction suitable for use with wheelchairs of different design.

Accordingly this invention consists in electric driving means for a wheelchair comprising an electric motor operable by a battery through control means, drive transmitting means coupled to the electric motor and including an output shaft carrying a driven pinion, a wheel plate supporting a rotatable wheel carrying a fixed pinion, mounting means for mounting said wheel plate on a frame member of the wheelchair, and a gear carrier mounted for pivotal movement relative to the fixed and driven pinions between a first extreme position and a neutral position, the gear carrier including first idler gear means for transmitting drive from the driven pinion to the fixed pinion when the gear carrier is in said first extreme position.

With this arrangement both the motor and wheel plate are fixed relative to each other but the drive may be engaged or disengaged by pivotting the gear carrier as appropriate.

The gear carrier is preferably pivotable by means of a cam carried on a rotatable shaft extending through the wheel plate and engageable with the carrier.

The first idler gear means conveniently may comprise a single gear which allows a neat compact arrangement.

In accordance with another preferred feature, the gear carrier also includes second idler gear means having a drive transmission ratio different to that of the first idler gear means, and the gear carrier is mounted for pivotal movement between said first position and a second extreme position in which said first and second idler gear means are respectively engaged with the driven and fixed pinions.

With this other preferred feature, the neutral or disengaged position intermediate the two extreme positions and the pivotal movement of the gear carrier may be achieved by the cam and shaft arrangement as aforementioned.

As will now be further understood, with the first and second idler gear means a two-speed drive may be achieved in a simple manner whilst still including disengagement without an intermediate clutch.

Conveniently, the second idler gear means may comprise a double stacked gear train of which one gear is engageable with the driven pinion, the other gear having a different number of teeth to said one gear and engageable with the fixed pinion.

The gear carrier conveniently is pivotable about the axis of the fixed pinion, and may be mounted for the pivotal movement on the wheel spindle or on the stub axle thereof.

The gear carrier may simply comprise a plate and a cover assembly with the first and second idler gear means supported therebetween, and an opening in the carrier through which the driven pinion extends for engagement by either the first or second idler gear means.

Additionally, the gear carrier plate includes a cam bush arranged for engagement with the cam to displace the gear carrier relative to its pivot axis.

In order that this invention be understood clearly, an exemplary embodiment of a wheelchair including electric driving means in accordance with this invention is depicted in the accompanying drawings.

BRIEF DESCRIPTION OF THE DRAWINGS

FIG. 5 is an enlarged sectional view taken along line B—B of FIG. 4 and including gear means not shown in FIG. 4;

FIG. 6 is a sectional view taken along line C—C of FIG. 3; and

FIG. 7 is a detail sectional view taken along line D—D of FIG. 5 depicting the gear means omitted from FIG. 4.

DESCRIPTION OF THE PREFERRED EMBODIMENT

Figure 1:
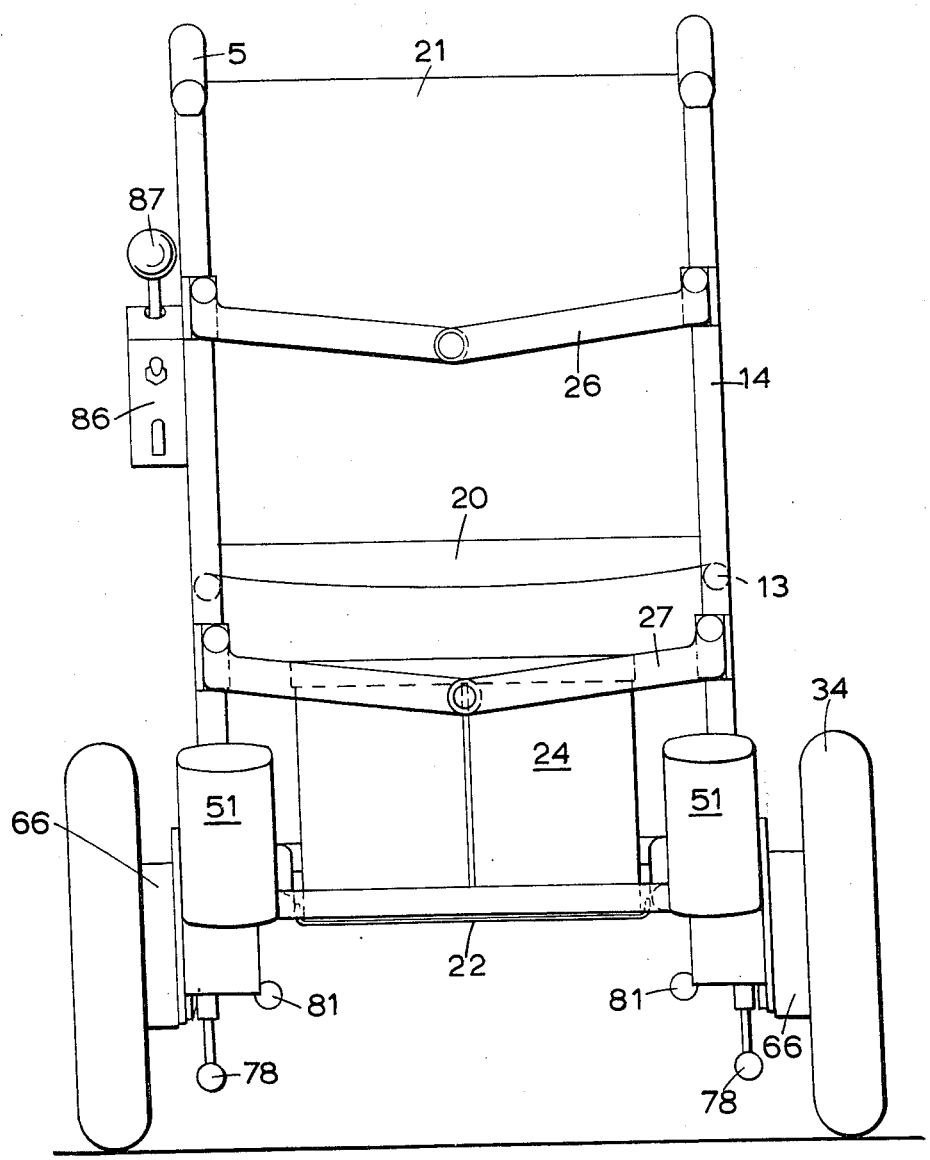
FIG. 1 is a rear elevational view of the wheelchair according to the present invention.
Figure 2:
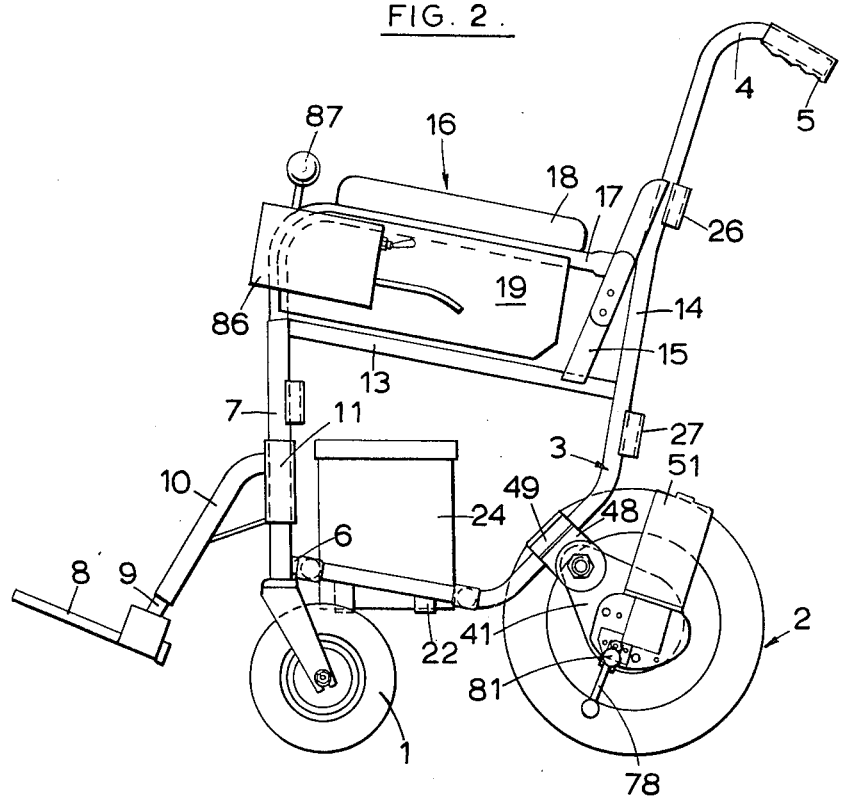
FIG. 2 is a side elevational view of the wheelchair of FIG. 1 with the nearside wheel and associated driving means being omitted for clarity.

With reference to the accompanying drawings the wheelchair comprises a tubular, foldable frame made principally of a light alloy supported on a pair of front castor wheels 1 and a pair of rear wheels 2 driven by the electric driving means according to this invention.

The frame comprises two main members 3 each of substantially L-shape having a rearwardly inclined upper handle portion 4 covered by a hand-grip 5 by means of which the wheelchair may be propelled manually. The lower end portion 6 of each main member is rigidly connected to the lower end of one of two front members 7 extending substantially vertical and carrying one of the castor wheels 1. Each front member 7 detachably carries a foot-rest 8 which is mounted on a stem 9 adjustable received within one end of a footrest hanger 10, the other end of the hanger being connected to a channel-shaped bracket 11 which embraces the front member 7 and is releasably locked thereto.

One of two seat support members 13 is fixed to the upper end of one of the front members 7 and the upstanding part 14 of the associated main member so that the seat support members extend substantially slightly downwardly and rearwardly inclined to the horizontal. Each seat support member 13 is also connected to the upstanding part 14 of the associated main member by a strut or link 15 and one of a pair of detachable arm rests 16 releasably engages with the strut 15 and a fixing such as a socket provided on the upper end of the associated front member 7. The arm rest 16 comprises a tubular L-shape element 17 carrying an elongated cushion 18 and a modesty panel 19.

A seat panel 20 of a flexible material extends between the two seat support members 13 and a similar back-rest panel 21 extends between the upstanding parts 14 of the two main members.

A carrier 22 supporting two 12 volt batteries 24 extends between the lower parts 6 of the two main members and is detachably mounted thereon so that the carrier 22 may be lifted for removal when the wheelchair is to be folded.

The upstanding parts 14 of the two main members are connected together by upper and lower hinged links 26,27 and the two front members 7 are also connected by a hinged assembly including two pairs of links (not shown). When the battery carrier 22 is removed these links enable the wheelchair to be folded with the two main members 3 being disposed side-by-side. Preferably, at least one of the links is arranged to maintain the wheelchair in the operative position (as shown) and to retain it against such folding movement when in use. This may be provided by a double link assembly in which the hinges permit the links being pivotted to an over-center locked position; alternatively an interlocking or manual fastening may be provided.

Each rear wheel 2 comprises a wheel center body 28 having axially spaced annular flanges 29,30 supporting respective spokes 31,32 carrying an annular rim 33 supporting a pneumatic tire 34. The body 28 has an internal bore seating a pair of flanged bushings 35,36. A wheel spindle 37 extends through the bushings 35,36 and the outer end of the spindle 37 is located by a clip 38 and covered by a dust cap 39. The wheel center body 28 carries a fixed drive pinion 40 concentric with the wheel spindle 37.

Figure 3:
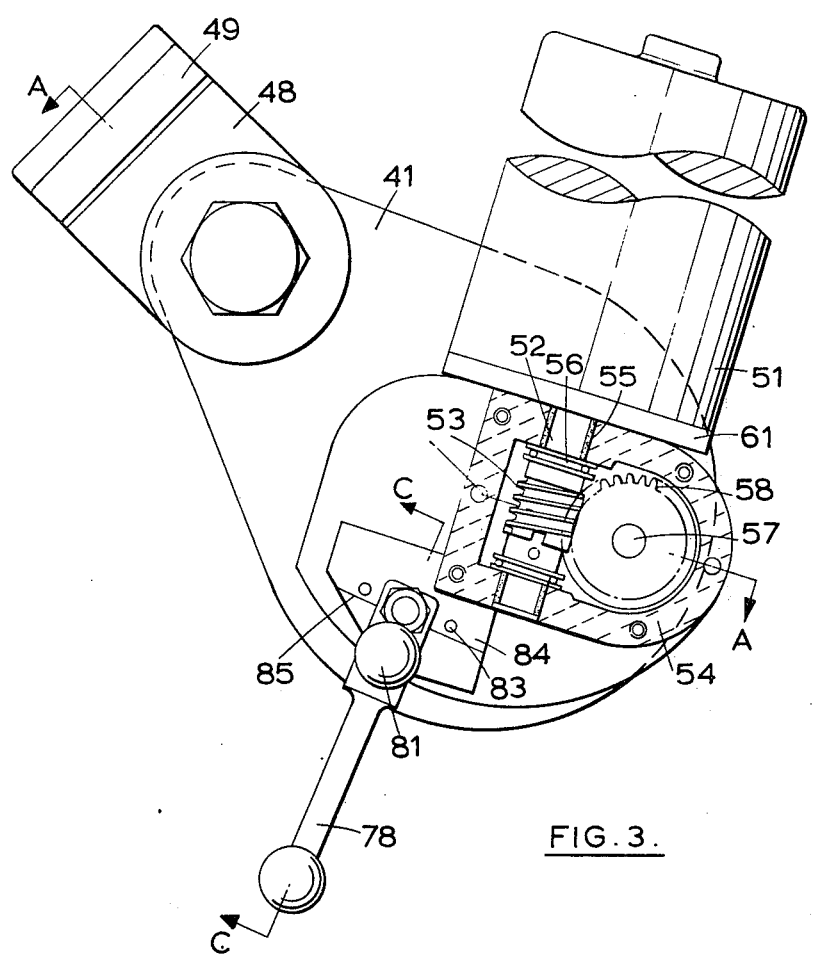
FIG. 3 is an enlarged detail part-sectional view of the driving means depicted in FIG. 2 with certain parts omitted for clarity.

Each rear wheel 2 is carried from the associated main frame member 3 by a wheel plate 41 of pear section shape as best seen in FIG. 3. The inner end of the wheel spindle 37 is threaded and extends through a piercing in the wheel plate 41, a spacer 42 extends on the wheel spindle between the fixed pinion 40 and the wheel plate 41 and two nuts 43 secure and lock the assembly together.

The narrow end of the wheel plate 41 has a further piercing through which one threaded end 44 of a resiliently mounted suspension pin 45 extends with a nut 46 securing the wheel plate 41 and suspension pin 45 together against relative movement. The suspension pin 45 is carried by a rubber-bonded bushing 47, such as sold under the Trade Mark METALASTIK, and this is seated in a bore in a bracket body 48. The bracket body 48 has a part cylindrical seating extending transverse to the bore and the elbow of the main frame member 3 is received in the seating and is clamped therein by a complementary bracket part 49 secured to the bracket body by bolts 50.

As will be understood, the resiliently mounted suspension pin 45 provides a support carrying the wheel plate 41 and wheel 2 whilst permitting limited resilient springing movement of the wheel 2 relative to the wheelchair frame. As each rear wheel 2 is independently mounted, the rear of the wheelchair has a resilient suspension which improves ride and handling characteristics.

The wheel plate 41 also mounts an electric motor 51 having a drive shaft 52 carrying a worm 53. As shown in FIG. 3, the drive shaft 52 is rotatably supported in a reduction gear box casing 54 by axially spaced bushings 55 and thrust bearings 56 between which the worm 53 is located. The reduction gear box casing further houses an output shaft 57 carrying a worm wheel 58 engaging the worm 53. The worm wheel 58 is fixed to the output shaft 57 for rotation therewith by a transverse key 59 and is supported between thrust bearings 60. The reduction gear box casing 54 is rigidly connected to the wheel plate 41 by bolts and the motor end plate 61 is rigidly bolted to the reduction gear box casing 54.

Figure 4:
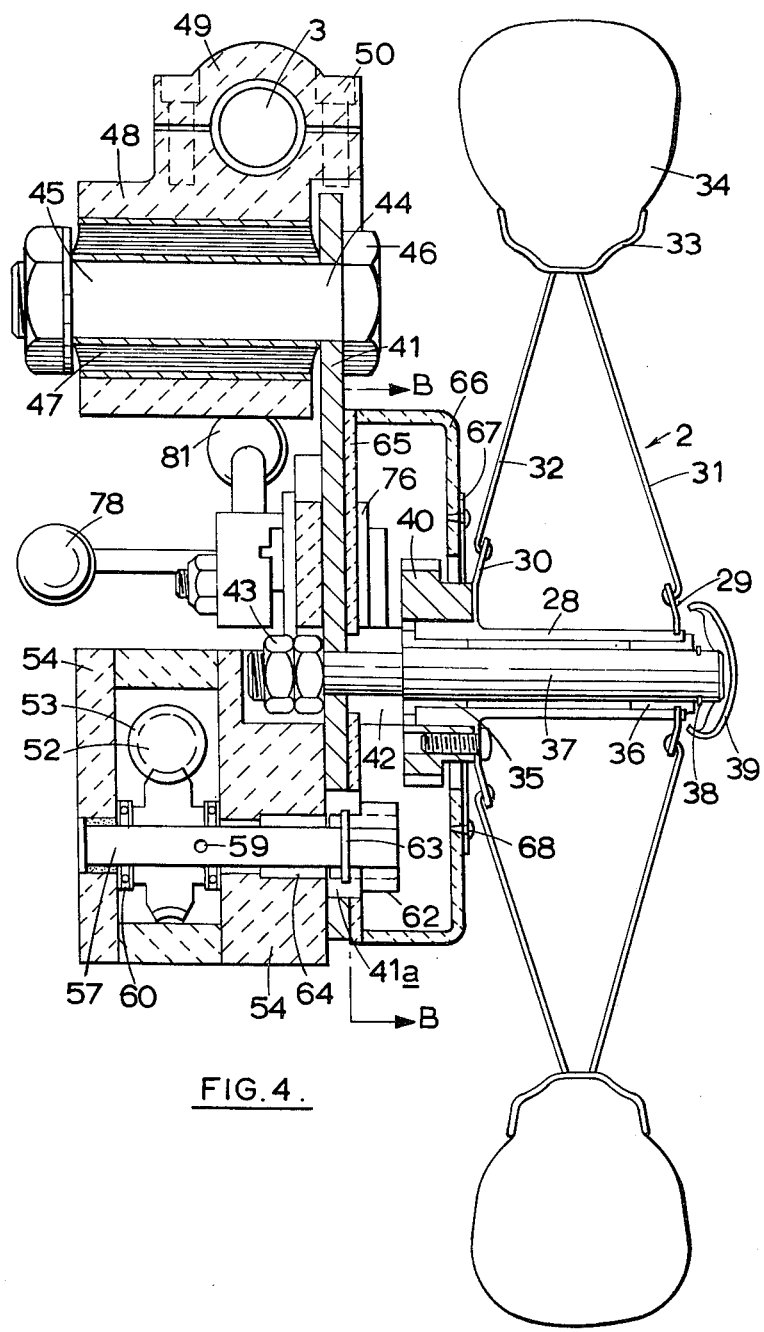
FIG. 4 is an enlarged sectional view taken along line A—A of FIG. 3 with certain parts omitted for clarity.

With reference to FIG. 4, the wheel plate 41 has a clearance opening 41a through which one end of the output shaft 57 extends carrying a driven pinion 62 fixed to the output shaft by a key 63. The output shaft 57 is rotatably supported in the reduction gear box casing by a bushing 64 seated in a bore in the casing through which the output shaft 57 extends. Drive from the output shaft 57 with the driven pinion 62 is transmitted to the fixed pinion 40 through an arrangement now to be described with reference also to FIGS. 5 and 7.

The driven pinion 62 and fixed pinion 40 are enclosed in a gear carrier comprising a circular back plate 65 extending adjacent the wheel plate 41 and mounted centrally for limited pivotal movement on the spacer 42 carried by the wheel spindle 37, and cup shaped cover 66 of which the rim is attached to the peripheral rim of the back plate. The main portion of the cover 66 has a central clearance opening to permit withdrawal/insertion of the fixed pinion 40 and wheel spindle assembly, and this opening is closed by an annular sealing element 67 attached to the cover by screws 68.

The main portion of the cover 66 extends in spaced parallel relationship to the back plate 65. A first idler gear 70 is supported for rotation between the plate 65 and cover 66 on a first axle 71 of which the ends are located in the plate and the cover. A second idler gear 72 is supported between the plate and the cover on a second axle 73 of which the ends are also located in the plate and the cover. The first idler gear comprises a single gear of which the teeth are in constant meshing engagement with the fixed pinion 40 of the wheel. The second idler gear 72 comprises a double stacked gear train having a bottom or low gear 74 with more teeth than an upper or high gear 75, the high gear 75 being in constant meshing engagement with the fixed pinion 40. This assembly comprises a gear carrier, and is shown in the drawings in the neutral position.

The gear carrier is caused to pivot by a rotatable eccentric cam 76 carried on a control shaft 77 extending through the back plate 65 and wheel plate 41 and rotatable by a manually operable control arm 78. The back plate carries a cam bush 79 having a cam-engaging face arranged so that when the control arm 78 is turned in a clockwise direction in the view of FIG. 5, the gear carrier is moved about its pivot in a clockwise direction to engage the first idler gear 70 with the driven pinion 62. Additionally, when the control arm 78 is moved in a counter-clockwise direction, the gear carrier is moved to engage the low gear 75 of the second idler gear with the driven pinion 62. Accordingly due to the different numbers of teeth on the first idler gear and the low gear of the second idler gear, on such movement of the gear carrier one of fast or slow speeds may be selected. In neutral, no drive transmission occurs even if the driven pinion is rotating and this has the advantage that in neutral the wheel may rotate freely without a reversing drive through the driven pinion to the motor.

The control arm 78, as depicted in FIG. 6, is formed with mounting boss 80 and a transverse bore in the boss mounts a spring-loaded locking lever 81 carrying a detent 82 arranged to seat in one of three recesses 83 corresponding to high, neutral and low gear, formed at appropriate positions in a mounting plate 84 connected to the reduction gear box casing 54 carried on the outer face of the wheel plate 41. As will be appreciated the locking lever 81 may be pulled outwardly from the boss 80 against the spring-loading to release the detent 82 prior to rotating the control arm 78. A small pin and slot device is embodied in the lever to hold same in the released position. In the two extreme positions of movement of the control arm 78, the boss 80 bears against a clamping face 85 on the mounting plate 84 which is relieved intermediate the top extreme positions as can be seen in FIGS. 3 and 6. The engagement of the boss 80 with either of the clamping faces further ensures that the pivotal gear carrier is clamped against the wheel plate in the selected driving position.

The electric motors 51 are each independently connected to the batteries 24 through a manually operable progressive control unit 86. Such control unit may be of any suitable known kind whereby a control handle 87 may be manipulated from a neutral control step position to a forward or rearward position with the distance of the movement of the handle being proportional to the power output to the motor to control the speed thereof. The control handle 87 also may be moved from one side or the other to control turning movement. As the electric motors are independent, the movement of the control handle 87 to one side is arranged to provide forward driving to one motor and reverse driving to the other motor so that very small turning circles or arcs may be achieved. However, any similar form of control unit could be utilised. Of course the control unit includes an on/off switch and the wiring harness (not shown) includes any suitable means for electrically connecting the batteries to a charging unit of suitable type.

The electric driving means of this invention is employed by selecting the desired driving ratio, that is high or low. Initially, the locking lever 81 is pulled outwardly and held there whilst the control arm 78 is pivotted into the selected position. The locking lever is then released to engage the detent 82 in the correct hole 83. Accordingly, the gear carrier is pivotted so that either the first or second idler gears engage and mesh with the driven pinion. When the motors 51 are activated through the control handle and control means, the driven pinions drive their associated wheels through the selected idler gears.

It is envisaged that although the aforedescribed embodiment relates to two-speed driving, a single speed could be provided by omitting one of the idler gears, and appropriately modifying the control arm and locking lever arrangement.

It is also envisaged that this invention could be utilised with wheelchairs having alternative forms and constructions of frames, and the wheelchair does not have to be foldable or collapsible.

It is also envisaged that the electric driving means may comprise an assembly of a wheel complete with motor, gear assembly and suspension mounting and other associated parts which could be fitted to an existing wheelchair frame instead of one of the original rear wheels. It is also feasible that the electric driving means may be embodied in a front wheel of a wheelchair.

Other alternatives and modifications for special applications will be apparent to those skilled in this field, but the advantages of this invention will be obvious especially in view of the compactness, versatility and simplicity of the invented driving means.

I claim:
1. Electric driving means for a wheelchair comprising a wheel plate, an electric motor mounted on said wheel plate and operable by a battery through control means, drive transmitting means on said wheel plate coupled to the electric motor and including an output shaft carrying a driven pinion, a rotatable wheel supported on said wheel plate and carrying a fixed pinion, mounting means for mounting said wheel plate on a frame member of the wheelchair, and a gear carrier mounted for pivotal movement relative to said fixed and driven pinions between a first extreme position, a neutral position, and a second extreme position, the gear carrier including first idler gear means for transmitting drive from the driven pinion to the fixed pinion when the gear carrier is in said first extreme position and second idler gear means having a drive transmission ratio different to that of said first idler gear means for transmitting drive from the driven pinion to the fixed pinion when the gear carrier is in said second extreme position.

2. Electric driving means according to claim 1 wherein the gear carrier is pivotal by means of an eccentric carried on a rotatable shaft extending through the wheel plate and engageable with a cam bush on the gear carrier.

3. Electric driving means according to claim 2 further including means responsive to movement of said eccentric for locking the position of said gear carrier with respect to said wheel plate.

4. Electric driving means according to claim 3 wherein said locking means comprises a camming surface on said wheel plate and a boss on the rotatable shaft of said eccentric for cooperation with said camming surface.

5. Electric driving means according to claim 1 wherein said first idler gear comprises a single gear.

6. Electric driving means according to claim 1 wherein said second idler gear means comprises a double stacked gear assembly of which one gear is engageable with the driven pinion, the other gear having a different number of teeth from said one gear and engaging the fixed pinion.

7. Electric driving means according to claim 1 wherein said wheel is rotatably supported on a spindle;

and wherein said gear carrier is mounted for pivotal movement on the wheel spindle.

8. Electric driving means according to claim 7 wherein said gear carrier comprises a plate and a cover assembly supporting said idler gears therebetween.

9. Electric driving means according to claim 8 wherein said gear carrier is movable between said first extreme position and said second extreme position by a rotatable cam.

10. Electric driving means according to claim 9 wherein said cam is an eccentric engageable with a cam bush carried by said gear carrier.

11. Electric driving means according to claim 10 wherein said cam is carried on a shaft rotatable by a control shaft and said control shaft is arranged for locking in a selected position by a releasible locking arm.

12. Electric driving means according to claim 1 wherein said drive transmitting means includes a reduction gear box carried by said wheel plate, said reduction gear box comprising said output shaft coupled to said electric motor by a worm wheel carried on said output shaft and engaging with a worm driven by said electric motor.

13. Electric driving means according to claim 1 wherein said wheel plate is resiliently carried by a mounting bracket for connection to the frame member, said mounting bracket including a bushing having a suspension medium arranged to permit limited resilient movement of the wheel plate relative to the bracket.

14. Electric driving meams according to claim 1 further including means for locking said gear carrier in said first extreme position, said second extreme position and said neutral position.

15. In a wheelchair having a frame supporting a pair of castor wheels, a paid of drive wheel assemblies, and a battery, the improvement wherein each of said drive wheel assemblies comprises
a support,
an electric motor on said support and operable by said battery through a control means,
drive transmitting means coupled to the electric motor and having an output shaft carrying a drive pinion,
a drive wheel rotatably mounted on said support and carrying a fixed pinion, and
gear transmission means on said support for coupling said drive pinion to said fixed pinion, said gear transmission means including a gear carrier mounted for pivotal movement relative to said fixed and drive pinions between a first extreme position and a neutral position, the gear carrier including at least one idler gear means for transmitting drive torque from the drive pinion to the fixed pinion when the gear carrier is in said first extreme position, and said carrier being moved by a rotatable eccentric engaging a cam bush on said gear carrier.

16. The invention as recited in claim 15 wherein said gear carrier includes second idler gear means having a drive transmission ratio different from that of said first idler gear means for transmitting drive torque from the drive pinion to the fixed pinion when the gear carrier is in a second extreme position.

* * * * *